United States Patent Office 3,443,950
Patented May 13, 1969

3,443,950
SEQUENTIAL POLYMERIZATION PROCESSES,
COMPOSITIONS AND ELEMENTS
Stokes Smith Rawlins, Jr., Bound Brook, N.J., assignor to E. I. du Pont de Nemours and Company, Wilmington, Del., a corporation of Delaware
No Drawing. Filed Oct. 8, 1965, Ser. No. 494,257
Int. Cl. G03c 1/76
U.S. Cl. 96—87
9 Claims

ABSTRACT OF THE DISCLOSURE

A coating composition comprising a sequentially polymerized mixture of
(a) 90 to 60% by weight of a vinylidene chloride/alkyl acrylate/itaconic acid copolymer wherein the alkyl group contains 1–4 carbon atoms and wherein said components are present in the respective amounts by weight of 35–96%, 3.5–64.5% and 0.5–25%, and
(b) 10 to 40% by weight of a polymer of an alkyl acrylate and/or methacrylate wherein the alkyl group contains 1–10 carbon atoms, formed by addition polymerization in the presence of said copolymer and photographic film base, and film embodying a layer of said composition.

---

This invention relates to polymer compositions and strata and to processes for preparing the compositions. It also relates to elements for graphic arts and photographic purposes embodying the strata. More particularly, it relates to papers and films coated with the polymer compositions and to photographic and drafting films embodying the coatings.

In the manufacture of photographic papers and films, a significant improvement was made in waterproofing and anchoring techniques with the development of the processes and products described and claimed in assignee's patents, Swindells U.S. Patent 2,698,235 and Alles et al. U.S. Patents 2,627,088 and 2,698,240. These patents describe the use of vinylidene halide copolymer aqueous dispersions and particularly copolymers of vinylidene chloride with acrylic esters and itaconic acid as coatings for films and papers suitable for the application of subsequent photographic coatings, particularly colloid silver halide emulsion coatings. The vinylidene chloride copolymer coatings of these patents in some instances supply water-proof qualities to the materials on which they are coated; but, more particularly, they also supply a strong adhesive bond between the base material and subsequently applied coatings, e.g., a gelatino-silver halide coating. Indeed, in the Alles et al. patents this is the primary function of the vinylidene chloride coatings, since many of the polyester films of those patents are substantially waterproof without additional coatings.

The vinylidene chloride copolymer compositions of the Swindells and Alles et al. patents have a wide range of compositions, and useful substratum coatings for a variety of photographic products have been made by varying the proportions of vinylidene chloride, acrylic ester and itaconic acid in the copolymers. However, some variations while improving one property of the substratum have a tendency to cause deterioration of another property. Thus, in certain graphic arts film products, it is desirable to have a substratum which is highly resistant to organic solvents used in staging lacquers, and this can be achieved by increasing the amount of vinylidene chloride in the substratum copolymer while reducing the amount of acrylic ester. When this is done, however, there is some tendency for the dry anchorage of the substratum (particularly anchorage after exposure, processing and drying of the film) to be reduced. While the films are still useful for most purposes, this effect is, nevertheless, undesirable. Other changes in copolymer composition desirable for some particular use or purpose may introduce still other problems for the film manufacturer and restrict the flexibility of his operations.

The polymer mixture compositions of assignee's co-pending patent application Cohen application Ser. No. 440,910, filed Mar. 18, 1965, substantially increase the adherence between the base material and subsequently applied coating over prior compositions. Cohen proposes use of a mixture of vinylidene chloride/alkyl acrylate/itaconic acid copolymer and alkyl acrylate or alkyl methacrylate homopolymer from separate polymerization. The polymer compositions of this invention have somewhat better adherence over the polymer mixture compositions of Cohen, but even more important, the coating characteristics are substantially improved. The improvement in coating characteristics is even more substantial over the alkyl acrylate compositions of the patents that are referred to above.

The improvement in coating characteristics includes absence of deleterious coating streaks, reduction in repellent spots, and masking of scratches due to improvements in the flow and covering properties of the sequentially polymerized compositions.

It is an object of the invention to provide improved vinylidene chloride-containing copolymer compositions for coating substratum layers on photographic base materials. It is a further object to provide a process for preparing the compositions. It is a still further object to produce improved substratum layers for polyester type film bases, particularly polyethylene terephthalate bases. It is a still further object to provide substratum layers for polyester film base materials which exhibit improved coating quality and uniformity. A related object is to prepare coated photographic films with improved balance of physical properties. Still further objects will be apparent from the following description and specific examples of this invention.

The foregoing objects are attained by the compositions, substrata and elements of this invention which comprise a sequentially polymerized mixture of
(a) A vinylidene chloride/alkyl acrylate/itaconic acid copolymer wherein the alkyl group contains 1–4 carbon atoms and said components are present in the respective amounts by weight 35 to 96%, 3.5 to 64.5% and 0.5 to 25%, and
(b) A polymer, i.e., homopolymer or copolymer, of an acrylate ester selected from the group consisting of (i) alkyl acrylates wherein alkyl contains 1–10 carbon atoms and (ii) alkyl methacrylates wherein alkyl contains 1–10 carbon atoms, polymerized in an aqueous dispersion of copolymer (a), the latter copolymer and polymer (b) in the respective amounts by weight of 90 to 60%, and 10 to 40%.

In making the compositions, 90 to 60 parts of an aqueous dispersion of a vinylidene chloride/alkyl acrylate/itaconic acid copolymer is mixed with from 10 to 40 parts, by weight, of a monomer of the alkyl acrylate and/or alkyl methacrylate, 0.01 to 5.0% or more, by weight, of the monomer of an addition polymerization initiator and, if desired, additional water and a dispersing agent, and then the monomer is polymerized at a temperature from 30° C. to 55° C. for 30 to 120 minutes.

A quite convenient method of preparing such a composition is to start with an aqueous dispersion of copolymer (a), admixing with it in the desired proportions by volume an aqueous dispersion containing the other unpolymerized ingredients for polymer (b), which preferably has the same percentage by weight of solids as the first dispersion, and then polymerizing the unpolymerized ingredients. Suitable polymerization initiators and dispersing agents are described below and in U.S. Patent 2,627,088. The mixture can then be coated on a suitable base material, e.g., amorphous polyethylene terephthalate and dried, and a biaxially stretched film prepared therefrom in the manner described in Alles U.S. Patent 2,779,684. The films so treated can be used as base materials for a variety of products, e.g., as a base for drafting film of the type described in Van Stappen U.S. Patent 2,964,423 or as a support for a photographic colloid silver halide emulsion or emulsions. As the tricomponent vinylidene chloride/alkyl ester/itaconic acid copolymer of the subbing compositions varies in composition over a wide range, any of the copolymers described in Swindells U.S. Patent 2,698,235 may be used, but the preferred compositions are those in which the vinylidene chloride component is in the higher range, e.g., above 75% of the total weight of copolymerizable monomers. Preferably, the copolymers are made by emulsion polymerization in a manner analogous to that employed in the Swindells patent. (Procedure A, which follows, utilizes a similar procedure.)

The acrylate or methacrylate homopolymers or copolymers for constituent (b) of the substratum described above, are made from monomers which include polyacrylate esters of alkanols of 1 to 10 carbon atoms and polymethacrylate esters of alkanols of 1 to 10 carbon atoms. When the acrylate or methacrylate polymers are polymerized after the copolymer, the method in Procedure A, which follows, can be used, or similar procedures, e.g., as described in assignee's pending application Nottorf U.S. Ser. No. 134,109, filed Aug. 28, 1961 (U.S. Patent 3,325,286, June 13, 1967), and corresponding British specification No. 961,490 can be used when adapted to the needs of this invention. The added acrylate and methacrylate polymers should have good impact resistance at room temperature, be readily compatible with the vinylidene chloride substratum copolymers, and have good adhesive properties. Suitable homopolymers are poly-2-ethylhexyl acrylate, polymethyl acrylate, poly-n-decyl acrylate, poly-n-butyl methacrylate, poly-n-hexyl methacrylate, polyethyl acrylate, poly-n-butyl acrylate, etc. Of these, polyethyl acrylate is preferred for most applications because of the ready availability and economy of the raw materials. Copolymers containing substantial amounts of ethyl acrylate are also preferred.

A preferred method of applying the sequentially polymerized copolymer resin is from an aqueous dispersion.

Any normal coating technique or equipment can be used to coat the compositions of this invention with a substantial resultant increase in coating characteristics over the prior art compositions, without an accompanying loss of adhesion properties and capabilities of the subcoating.

The invention will now be illustrated, but is not intended to be limited, by the following procedures and examples in which all light-sensitive coatings are applied in the substantial absence of actinic light, and all parts and percentages are by weight unless otherwise specified.

PROCEDURE A

Polymerization inhibitors are removed from vinylidene chloride and methyl acrylate in the customary manner and the purified monomers were then mixed in amounts of 91 parts vinylidene chloride and 10 parts of methyl acrylate with:

| | Parts |
|---|---|
| Itaconic acid | 2 |
| Water | 157 |
| Ammonium persulfate | 0.366 |
| Sodium metabisulfite | 0.176 |
| Sodium salt of lauryl alcohol sulfate (30% aqueous) | 6.6 |

(The sodium lauryl sulfate is a mixture of sodium alkanol sulfate containing 10–16 carbon atoms and predominates in sodium dodecyl sulfate.) The mixture is stirred in a vessel provided with a reflux condenser and the temperature maintained at about 32° to 45° C. until all of the vinylidene chloride has reacted as indicated by cessation of reflux. At this point, the temperature is raised to 40° C. for about 15 minutes and then rapidly cooled to 30° C., and stirred for an additional 5 minutes. The resulting dispersion will have a total solids content of 37 to 41%.

Polymerization inhibitor is removed from ethyl acrylate in the customary manner and the purified monomer is used to prepare the sequentially polymerized final product as follows:

In a suitable vessel, 4.5 parts of a 30% aqueous solution of the sodium salt of lauryl alcohol sulfate and about 31 parts of distilled water are mixed with the dispersion obtained from the first paragraph of this procedure. To this solution there is added 3.6 parts of the purified ethyl acrylate and a solution of 0.14 part of ammonium persulfate in 1.4 parts of water, which is followed by the addition of 0.11 part of sodium metabisulfite in 1.2 parts of water. The temperature is raised to 45°–48° C. and held at this temperature for 10 minutes. An additional 36 parts of ethyl acrylate is added at the rate of 1.2 parts per minute while the temperature is maintained between 30° and 55° C. The course of the reaction may be followed by adding 50 ml. of saturated potassium chloride solution to a 50 ml. sample of the suspension taken about 15 minutes after the start of feed. The addition of the KCl solution causes precipitation of the polymer as a mass of curds. If the reaction is not proceeding properly, no precipitate will be formed. Addition continues until all of the ethyl acrylate has been added. As soon as all of the ethyl acrylate has been added, the temperature is maintained between 30° and 55° C. for one-half hour. The dispersion is then cooled to about 30° C. and filtered through felt into a suitable storage container. The dispersion of sequentially polymerized material typically will have a solids content of 40 to 45%, and has a polymer ratio of about 75% by weight of the vinylidene chloride/methyl acrylate/itaconic acid copolymer to about 25% by weight of the ethyl acrylate polymer.

Example I

The dispersion of sequentially polymerized material described in Procedure A of this invention was diluted with water to a concentration of 25% solids. The dispersion was placed in the solution receptacle which was located just below the roller in a bead roll coater. The dispersion was then coated, using the bead roll technique, onto both sides of a polyethylene terephthalate film which was cast at a thickness of about 0.075 inch after the manner described in Example IV of Alles U.S. Patent 2,779,684. The dispersion was kept at a temperature of 95° F. during coating. The web speed was about 20–35 feet per minute. Examination under these operating conditions indicated excellent coating uniformity and an increased ease of dip roll coater operation as compared to control coating dispersions. The first control coating dispersion consisted of a mixture of the vinylidene chloride/methyl acrylate/itaconic acid copolymer and an ethyl-acrylate polymer prepared as described in Procedures A and B of assignee's copending application, Cohen Ser. No. 440,910, filed Mar. 18, 1965. The second dispersion consisted of a vinylidene chloride/methyl acrylate/itaconic acid copolymer dispersion prepared as described in the first paragraph of Procedure A of this invention. Both control dispersions were diluted with water to 25% solids, and bead roll coated in a manner identical to the technique described above onto webs of polyethylene terephthalate film identical to the film described above. The first control coating indicated poor coating uniformity and the second control coating indicated fair coating uniformity. From the standpoint of actual operation of the dip roll coater, the control dispersions were not as easy to apply onto the film base.

The film base containing the sequentially polymerized coating and the two films containing the control coatings were biaxially stretched at about 95° C., first longitudinally and then laterally, about 3 times in unit length and width to provide a final thickness of about .007 inch with a copolymer mixture coating weight of about 5 to 10 mg. per square decimeter on each side. The films were then heat-set while under restraint at about 188° C. and then coated on both sides with a thin anchoring substratum layer of gelatin (0.5 mg./dm.²). After coating, the films were allowed to shrink under low tension at about 130–135° C. On one gelatin surface there was coated a gelatin, nonhalation dye-containing layer and on the other side a gelatino-silver halide photographic emulsion of the lithographic type comprising 30 mole percent AgBr and 70 mole percent AgCl at a coating weight of 50.6 mg./dm.² of silver and 55 mg./dm.² of gelatin.

Samples of all three films were given a 20-second, intensity scale, sensitometric, step-wedge exposure to a white light, tungsten source. The exposure in each successive step increased by the fourth root of two. The exposed samples were developed for 2¼ minutes in the following lithographic developer:

| | | |
|---|---|---|
| Water | ml | 500 |
| $Na_2SO_3$, anhydrous | g | 30 |
| Paraformaldehyde | g | 7.5 |
| $NaHSO_3$ | g | 2.2 |
| Boric acid | g | 7.5 |
| Hydroquinone | g | 22.5 |
| Potassium bromide | g | 1.6 |

Water to make 1 liter.

After fixing, washing, and drying in the conventional manner the sensitometric properties of all three films were found to be identical within the limits of experimental error. All three films were found to have satisfactory wet anchorage when tested by exposing samples to white light, processing as above, and, after washing, but before drying, scribing two lines 2 inches long and ½ inch apart through the emulsion layer with a phonograph needle and rubbing across the marks with a rubber squeegee. None of the coatings showed any tendency to peel from the base. On testing the dry anchorage, however, the experimental film with the sequentially polymerized dispersion used in the sub-coating was definitely superior to the control film having the 100% vinylidene chloride/methyl acrylate/itaconic acid copolymer dispersion used in the sub-coating, and was slightly superior to the film having the mixture of polymers dispersion used in the sub-coating. The test for dry anchorage was made by taking three groups of 10 samples of each coating, exposing them to white light, and processing as described above. The processed and dried samples were then scored with a phonograph needle to produce four parallel scratches through the emulsion layer ¼ inch apart. A series of lines were then scored across these lines at an angle of about 60° to them and about ¼ inch apart to produce 3 lines of 9 rhomboid figures scratched through the emulsion layer. A piece of cellophane, pressure-sensitive, adhesive tape is then pressed down over the scored area and a loose end of the tape grasped at about a 90° angle to the film surface. The tape is pulled up briskly and an arbitrary measure of adhesion obtained by comparing each group of 10 samples with a graded series of standards prepared with films having excellent to very poor anchorage. The arbitrary scale ranges from a value of 0 for excellent anchorage to 10 for very poor anchorage. Tested in this manner, the ten samples of experimental film with the sequentially polymerized dispersion used in the subcoating were rated from 0 to 1 on the arbitrary scale while the control film having the 100% vinylidene chloride/methyl acrylate/itaconic acid copolymer dispersion used in the subcoating rated from 6 to 7, and the control film having the mixture of polymers dispersion used in the subcoating rated from 0 to 2.

Example II

A film was made in a manner similar to the film of Example I except that the thickness of the base as cast was .045 inch before and .004 inch after stretching, the sequentially polymerized subbing dispersion consisted of a 90:10 polymer ratio by weight of vinylidene chloride/methyl acrylate/itaconic acid copolymer to ethyl acrylate polymer (made as described in Procedure A), and coated at a coating weight of about 3 mg./dm.², the nonhalation coating comprised a 3.58 gelatin/polyethyl acrylate mixture prepared by mixing a gelatin dispersion with polyethyl acrylate (prepared as in the second and third paragraphs of Procedure A without the vinylidene chloride/methyl acrylate/itaconic acid copolymer being added), and the silver halide emulsion was prepared in the same manner as that described in Example I of assignee's British patent specification No. 961,490, Oct. 14, 1964. When tested in the manner described in Example I, the results were equivalent to those obtained in Example I.

Example III

A series of films was prepared similar to the film of Example I in which the dispersions of sequentially polymerized material had the following polymer ratios of vinylidene chloride/methyl acrylate/itaconic acid copolymer to ethyl acrylate of Procedure A.

Parts by wt. of vinylidene chloride/methyl acrylate/itaconic acid to ethyl acrylate:

95–5
90–10
85–15
80–20
75–25
70–30
65–35
60–40
55–45
50–50
45–55
40–60
35–65

The dispersions were coated at final coating weights of both 5–10 mg./dm.² and 2.5–4.0 mg./dm.². Those employing from 10 to 40 parts by weight of the ethyl acrylate in the sequentially polymerized subcoating all exhibited better coating quality and uniformity than either of the control films of Example I.

When tested as described in Example I all of the films displayed essentially the same photographic properties. The above described range of experimental films all exhibited better dry anchorage than the control films of Example I.

Example IV

A film was made in a manner similar to the film of Example II and coated on both sides with the subbing dispersion of that example followed by a thin, anchoring, substratum layer of gelatin applied at a coating weight of 0.5 mg./dm.². One side of the film was coated with a layer of 125 mg./dm.² of a mixture of 66.67 parts of gelatin and 33.33 parts of polyethyl acrylate prepared by mixing a gelatin dispersion with polyethyle acrylate (prepared as in the second and third paragraphs of Procedure A without the vinylidene chloride/methyl acrylate/itaconic acid copolymer being added). The other side of the film was coated with a blue-sensitive, photographic silver bromoiodide emulsion prepared in a manner identical to that described in assignee's British patent 619,938 in which the silver halide consisted of 3.14 mole percent silver iodide and 96.86 mole percent silver bromide and the binder for the emulsion was a mixture of 55.6 parts gelatin, 27.7 parts polyethyl acrylate, and 16.7 parts of polyvinyl pyrrolidone (on a solid basis). The coating weight of the emulsion layer was 63 mg./dm.² of silver and 142 mg./dm.² of total binder. This film and a control film made in an identical fashion, except that the copolymer substratum layer contained 100% of the vinylidene chloride/mehtyl acrylate/itaconic acid copolymer dispersion prepared as in the first paragraph of Procedure A, were exposed as in Example I, except that the exposure in each successive step varied by the square root of two. The films were then developed for three minutes in a developer consisting of:

|  | G. |
|---|---|
| Monomethyl-p-aminophenosulfate | 2.5 |
| Na$_2$SO$_3$ (desiccated) | 50 |
| Hydroquinone | 2.5 |
| Na$_2$CO$_3$·H$_2$O | 24.0 |
| Borax | 14.0 |
| KBr | 0.5 |

Water to make 1 liter.

After development, the films were treated in a conventional hardening and fixing bath, washed, and dried. The sensitometric properties of the films were found to be identical within the limits of experimental error. When wet and dry anchorage were tested as in Example I, the film having the substratum made from the sequentially polymerized dispersion exhibited superior dry anchorage and equivalent wet anchorage as compared to the control.

Example V

Six sequentially polymerized dispersions were made as described in Procedure A, except that the substitutions indicated below were made for ethyl acrylate in the second and third paragraphs of Procedure A. The materials were substituted for ethyl acrylate on a weight for weight basis.

| Sequentially polymerized dispersion: | Substitute for ethyl acrylate |
|---|---|
| 1 | Methyl acrylate |
| 2 | n-Butyl acrylate |
| 3 | 2-ethylhexyl acrylate |
| 4 | n-decyl acrylate |
| 5 | n-butyl methacrylate |
| 6 | n-hexyl methacrylate |

The aqueous dispersions were diluted with water to a concentration of 25% by weight of solids, and then each was coated on both surfaces of a polyethylene terephthalate film that was cast at a thickness of about 0.075 inch as described in Example IV of Alles U.S. Patent 2,779,684. All these sub-coatings exhibited excellent coating quality and uniformity.

The experimental films were biaxially stretched, and heat set as described in Example I hereof. Both surfaces of each film were coated with a thin anchoring substratum layer of gelatin (0.5 mg./dm.²). After coating, each film was allowed to shrink under low tension at about 130–135° C. On one gelatin surface there was coated a gelatin, antihalation dye-containing layer and on the other side a gelatino-silver halide photographic emulsion of the lithographic type described in Example I. The six films were tested in comparison with a control film having the same photographic emulsion, except that the initial coatings on the film base were 100% of the vinylidene chloride/methyl acrylate/itaconic acid copolymer dispersion prepared as described in the first paragraph of Procedure A. The subcoating of the control film only demonstrated fair coating quality and uniformity.

Samples of all of the films were exposed as described in Example I and were developed for 2¼ minutes in the developer of Example I. After fixing, washing, and drying the sensitometric properties of all of the films were found to be substantially identical. All of the films had satisfactory wet anchorage when tested by the method described in Example I. None of the coatings showed any tendency to peel from the base. On testing the dry anchorage, however, the experimental films with the sequentially polymerized dispersions used in the subcoating were definitely superior to the control. The test for dry anchorage was the same as that described in Example I. Tested in the manner there described, the group of ten samples of each of the experimental films having sequentially polymerized dispersions used in the subcoating were rated from 0 to 1 on the arbitrary scale, which was excellent or very good, while the control rated from 6 to 7, which was fair.

Example VI

Example I was repeated except that n-butyl acrylate was used as the alkyl acrylate instead of methyl acrylate and the ratio of the vinylidene chloride/alkyl acrylate/itaconic acid in the terpolymer was 80/20/2 instead of 90/10/2. Results comparable to those obtained in Example I were obtained.

The film support for the emulsion layers used in the novel process may be any suitable transparent plastic. For example, the cellulosic supports, e.g., cellulose acetate, cellulose triacetate, cellulose acetate butyrate, etc., may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Patent 2,779,684, and the patents referred to in the specification of that patent are eminently satisfactory. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al. U.S. Patent 3,052,543 may also be used. The above polyester films are particularly suitable because of their dimensional stability.

In addition, the sequentially polymerized subbing compositions of the invention may be applied to paper and cloth.

The subbing compositions of the present invention are ideally suited for the reception of gelatin coatings, e.g., gelatin subbing treatments, nonhalation layers and photographic emulsions.

In place of part or all of the gelatin other natural or synthetic water-permeable organic colloid binding agents can be used in the intermediate or photographic emulsion layers coated on the substratum layers of the present invention. Such agents include water-permeable or water-soluble polyvinyl alcohol and its derivatives, e.g., partially hydrolyzed polyvinyl acetates, polyvinyl ether, and acetals containing a large number of extra-linear —CH$_2$CHOH— groups: hydrolyzed interpolymers of vinyl acetate and unsaturated addition polymerizable compounds such as maleic anhydride, acrylic and methacrylic acid ethyl esters, and styrene. Suitable mixed colloid emulsions are described in assignee's pending applications Nottorf Ser. Nos. 94,989, now Patent No. 3,142,568, and 134,109, filed Mar. 13, 1961, and Aug. 28, 1961, respectively, and Cohen and Shacklett British patent specification 976,222 and U.S. Patent 3,203,804, Aug. 31, 1965, respectively. The useful polyvinyl acetals include polyvinyl acetaldehyde acetal, polyvinyl butyraldehyde acetal and polyvinyl sodium o-sulfobenzaldehyde acetal. Other useful colloid binding agents include the poly-N-vinyllactams of Bolton U.S. Patent 2,495,918, the hydrophilic copolymers of N-acrylamido alkyl betaines described in Shacklett U.S. Patent 2,833,650 and hydrophilic cellulose ethers and esters.

In addition to serving as substratum anchoring layers for photographic coatings, the coatings of the present invention also provide strongly adherent, flexible substrata for drafting film coatings, e.g., the ureaformaldehyde and melamine formaldehyde coatings of Van Stappen 2,964,423 and the acrylic polymer coatings of Moede U.S. application Ser. No. 339,849, filed Jan. 24, 1964, U.S. Patent 3,353,958, Nov. 21, 1967, containing an organic or inorganic toothing agent.

The drafting film coatings of 2,964,423 contained as toothing agents silica, ground glass, titanium oxide, chalk, talc, diatomaceous earth and magnesium carbonate with average particle sizes from 0.1 to 10 and preferably 0.2 to 4 microns.

The matted acrylic coatings of Moede 3,353,958 contained uniformly dispersed, finely divided, discrete particles of a water-insoluble, translucence-producing solid matting agent having an average particle size from about 0.1 to 10.0 microns. Suitable matting agents disclosed in this patent, silica hydrosols, silicon dioxide, titanium dioxide and starch.

The subbing compositions and/or subsequent coatings can be applied to the web supports or films by any method known to the art, e.g., dip or skim coating, or coating with rollers. Suitable coating methods are shown in Heilman U.S. 3,025,828, Wamsley U.S. 3,038,441, Brandsma et al. U.S. 3,063,868, and Haley U.S. 3,082,144. Various coating aids and surfactants may be added in the manner known to the art, but must be compatible with the surfactants, if any, already present and not deleterious to subsequently applied coatings, e.g., photographic emulsions.

The subbing compositions may contain various pigments and dyes for various purposes, e.g., carbon black, barium sulfate, titanium dioxide, zinc oxide, magnesium oxide, silicon dioxide, phthalocyanines and other organic and inorganic pigments can be used as well as various dyes, e.g., among the dyes useful in the invention are Fuchsine (C.I. 42,510), Auramine Base (C.I. 41,000B), Calcocid Green S (C.I. 44,090), Para Magenta (C.I. 42,500), Tryparosan (C.I. 42,505), New Magenta (C.I. 42,520), Acid Violet RRL (C.I. 42,425), Red Violet 5RS (C.I. 42,690), Nile Blue 2B (C.I. 51,185), New Methylene Blue GG (C.I. 51,195), C.I. Basic Blue 20 (C.I. 42,585), Iodine Green (C.I. 42,556), Night Green B (C.I. 42,115), C.I. Direct Yellow 9 (C.I. 19,540), C.I. Acid Yellows 17 (C.I. 18,965), C.I. Acid Yellows 29 (C.I. 18,900), Tartrazine (C.I. 19,140), Supramine Yellow G (C.I. 19,300), Buffalo Black 10B (C.I. 27,790), Naphthalene Black 12R (C.I. 20,350), Fast Black L (C.I. 51,215), and Ethyl Violet (C.I. 20,350), and Ethyl Violet (C.I. 42,600).

It is an advantage of the present invention that it permits the formation of water-proof coatings for photographic papers, film base or drafting films. A further advantage is that the invention supplies coatings which are firmly adherent in both the wet and dry states to a wide variety of natural and synthetic polymer. A still further advantage is the fact that the coatings of the present invention may be altered readily to provide films suited to a variety of different uses. A still further advantage is the fact that the polymers used in the coatings are readily and economically prepared by conventional processes. The sequentially polymerized dispersions used to obtain the substrata of this invention exhibit superior coating quality as compared to the prior art dispersions used to obtain mixed homopolymer/vinylidene chloride copolymer substrata in that they are free from repellent spots and scratches due to improvements in flow and covering properties. At the same time, the novel copolymer substrata of this invention have good resistance to the organic solvents that are used in staging laquers, and have slightly improved adherence to polyester film bases and water-permeable colloid layers over prior art tricomponent vinylidene chloride copolymer layers or substrata, which is an important advantage.

The embodiments of the invention in which an exclusive property or privilege is claimed are defined as follows.

I claim:
1. The process which comprises admixing an aqueous dispersion of
   (a) 90 to 60% by weight of a vinylidene chloride/alkyl acrylate/itaconic acid copolymer wherein the alkyl group contains 1–4 carbon atoms and wherein said components are present in the respective amounts by weight of 35–96%, 3.5–64.5% and 0.5–25%, with
   (b) 10 to 40% by weight of an alkyl acrylate and/or methacrylate wherein the alkyl group contains 1–10 carbon atoms and initiating amounts of an addition polymerization initiator and polymerizing any monomer present to a polymer.
2. A process according to claim 1 wherein the polymerizing reaction is at 30 to 55° C. for 30 to 120 minutes.
3. A coating composition comprising a sequentially polymerized mixture of
   (a) 90 to 60% by weight of a vinylidene chloride/alkyl acrylate/itaconic acid copolymer wherein the alkyl group contains 1–4 carbon atoms and wherein said components are present in the respective amounts by weight of 35–96%, 3.5–64.5% and 0.5–25%, and
   (b) 10 to 40% by weight of a polymer of an alkyl acrylate and/or methacrylate wherein the alkyl group contains 1–10 carbon atoms, formed by addition polymerization in the presence of said copolymer.
4. A film base comprising
   (1) a hydrophobic organic polymer film bearing on at least one surface
   (2) a thin substratum of a sequentially polymerized mixture of
       (a) 90 to 60% by weight of a vinylidene chloride/alkyl acrylate/itaconic acid copolymer wherein the alkyl group contains 1–4 carbon atoms and wherein said components are present in the respective amounts by weight of 35–96%, 3.5–64.5% and 0.5–25%, and
       (b) 10 to 40% by weight of a polymer of an alkyl acrylate and/or methacrylate wherein the alkyl group contains 1–10 carbon atoms, formed by addition polymerization in the presence of said copolymer.
5. A film base according to claim 4 wherein said polymer film is polyethylene terephthalate.
6. A photographic film comprising
   (1) a dimensionally stable organic polymer film bearing, in order, on at least one surface
   (2) a thin substratum of a sequentially polymerized mixture of
       (a) 90 to 60% by weight of a vinylidene chloride/alkyl acrylate/itaconic acid copolymer wherein the alkyl group contains 1–4 carbon atoms and wherein said components are present in the respective amounts by weight of 35–96%, 3.5–64.5% and 0.5–25%, with
       (b) 10 to 40% by weight of a polymer of an alkyl acrylate and/or methacrylate wherein the alkyl group contains 1–10 carbon atoms, formed by addition polymerization in the presence of said copolymer;
   (3) a water-permeable colloid sublayer, and
   (4) a water permeable colloid photographic silver halide emulsion layer.
7. A photographic film according to claim 6 wherein said colloid embodies gelatin.
8. A photographic film according to claim 6 wherein said polymer film is polyethylene terephthalate.
9. A drafting film comprising
   (i) a dimensionally stable organic polymer film bearing, in order, on at least one surface
   (ii) a thin substratum of a sequentially polymerized mixture of

(a) 90 to 60% by weight of a vinylidine chloride/ alkyl acrylate/itaconic acid copolymer wherein the alkyl group contains 1-4 carbon atoms and wherein said components are present in the respective amounts by weight of 35-96%, 3.5-64.5% and 0.5-25%, and (b) 10 to 40% by weight of a polymer of an alkyl acrylate and/or methacrylate wherein the alkyl group contains 1-10 carbon atoms, formed by addition polymerization in the presence of said copolymer, and (iii) a drafting layer comprising an organic polymeric binding agent and a finely divided organic or inorganic toothing agent.

References Cited

UNITED STATES PATENTS

| 2,698,235 | 12/1954 | Swindells | 96—87 |
| 2,894,927 | 7/1954 | Elder et al. | 260—29.6 |
| 2,991,260 | 7/1961 | Auer et al. | 260—29.6 XR |
| 3,043,695 | 7/1962 | Alles | 96—83 |
| 3,227,576 | 1/1966 | Van Stappen | 117—76 |
| 3,254,044 | 5/1966 | Gunderman et al. | 260—29.6 |

NORMAN G. TORCHIN, *Primary Examiner.*

RONALD A. SMITH, *Assistant Examiner.*

U.S. Cl. X.R.

260—29.6; 117—138.8, 161

PO-1050
(5/69)

UNITED STATES PATENT OFFICE
CERTIFICATE OF CORRECTION

Patent No. 3,443,950　　　　　　　　Dated May 13, 1969

Inventor(s) Stokes Smith Rawlins, Jr.

It is certified that error appears in the above-identified patent and that said Letters Patent are hereby corrected as shown below:

> Col. 6, line 48, "contrrol" should be --control--; line 63, "polyethyle" should be --polyethyl--; line 69, "British patent 619,938" should read --British Patent Specification 976,222 and corresponding Belgian Patent 619,938--.
>
> Col. 7, line 4, "mehtyl" should read --methyl--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents